US012491869B2

(12) United States Patent
Cai et al.

(10) Patent No.: US 12,491,869 B2
(45) Date of Patent: Dec. 9, 2025

(54) METHOD FOR CONTROLLING VEHICLE, VEHICLE AND ELECTRONIC DEVICE

(71) Applicant: BEIJING XIAOMI MOBILE SOFTWARE CO., LTD., Beijing (CN)

(72) Inventors: Rui Cai, Beijing (CN); He Zhang, Beijing (CN); Zhiwei Li, Beijing (CN); Hao Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 308 days.

(21) Appl. No.: 17/588,258

(22) Filed: Jan. 29, 2022

(65) Prior Publication Data

US 2023/0055978 A1 Feb. 23, 2023

(30) Foreign Application Priority Data

Aug. 23, 2021 (CN) .......................... 202110969507.8

(51) Int. Cl.
*B60W 30/09* (2012.01)
*B60Q 1/14* (2006.01)
(Continued)

(52) U.S. Cl.
CPC ........... *B60W 30/09* (2013.01); *B60Q 1/1415* (2013.01); *G06T 7/521* (2017.01); *G06T 7/70* (2017.01);
(Continued)

(58) Field of Classification Search
CPC ............. B60W 30/09; B60W 2552/35; B60W 2552/53; B60W 2555/60; B60W 2552/15;
(Continued)

(56) References Cited

U.S. PATENT DOCUMENTS 8,727,590 B2 * 5/2014 Kinoshita ............. F21S 41/338
362/539
8,977,007 B1 * 3/2015 Ferguson ............. G06V 20/584
382/104
(Continued)

FOREIGN PATENT DOCUMENTS

CN 110084133 A 8/2019
EP 3070641 A1 9/2016
(Continued)

OTHER PUBLICATIONS

European Patent Application No. 22154189.9, Search and Opinion dated Jul. 25, 2022, 11 pages.
(Continued)

*Primary Examiner* — Erin D Bishop
*Assistant Examiner* — Shivam Sharma
(74) *Attorney, Agent, or Firm* — Cozen O'Connor

(57) ABSTRACT

A method for controlling a vehicle is provided. The vehicle includes an image capturing device. The method includes: controlling the image capturing device to collect an image of a scene where the vehicle is located; acquiring projection information of a projection pattern in the image; determining image-altering information corresponding to the projection pattern according to the projection information; and controlling movement of the vehicle according to the image-altering information.

6 Claims, 6 Drawing Sheets

(51) Int. Cl.
*G06T 7/521* (2017.01)
*G06T 7/70* (2017.01)
*G06V 10/141* (2022.01)
*G06V 10/24* (2022.01)
*G06V 20/56* (2022.01)
*G06V 20/58* (2022.01)
*H04N 23/90* (2023.01)

(52) U.S. Cl.
CPC .......... *G06V 10/141* (2022.01); *G06V 10/245* (2022.01); *G06V 20/58* (2022.01); *G06V 20/588* (2022.01); *H04N 23/90* (2023.01); *B60W 2420/403* (2013.01); *B60W 2552/15* (2020.02); *B60W 2552/35* (2020.02); *B60W 2552/53* (2020.02); *B60W 2555/60* (2020.02); *G06T 2207/30256* (2013.01); *G06T 2207/30261* (2013.01)

(58) Field of Classification Search
CPC .... B60W 2420/403; G06T 7/521; G06T 7/70; G06T 2207/30256; G06T 2207/30261; G06V 10/141; G06V 20/58; G06V 20/588; G06V 10/245; H04N 23/90; B60Q 1/1415
See application file for complete search history.

(56) References Cited

U.S. PATENT DOCUMENTS

| | | | |
|---|---|---|---|
| 11,073,379 B2* | 7/2021 | Heinrich | H04N 13/239 |
| 2007/0124949 A1* | 6/2007 | Burns, Jr. | G01B 11/2545 |
| | | | 33/288 |
| 2017/0261315 A1* | 9/2017 | Yamaguchi | G08G 1/16 |
| 2018/0319327 A1* | 11/2018 | Cunningham, III | G08G 1/168 |
| 2019/0179025 A1* | 6/2019 | Englard | G06F 18/217 |
| 2019/0220677 A1* | 7/2019 | Lipson | G06V 20/588 |
| 2019/0295274 A1* | 9/2019 | Rutkiewicz | G06T 7/521 |
| 2020/0302626 A1* | 9/2020 | Ikeoh | G06T 7/521 |

FOREIGN PATENT DOCUMENTS

| | | | | |
|---|---|---|---|---|
| FR | 3078667 A1 | | 9/2019 | |
| SI | 21385 A | * | 6/2004 | G01B 11/00 |

OTHER PUBLICATIONS

European Patent Application No. 22154189.9 Search Report dated Dec. 6, 2024, 7 pages.

Chinese Patent Application No. 202110969507.8 Office Action with English translation dated Apr. 1, 2025, 15 pages.

* cited by examiner

METHOD FOR CONTROLLING VEHICLE, VEHICLE AND ELECTRONIC DEVICE

CROSS-REFERENCE TO RELATED APPLICATIONS

This application is based on and claims priority to the Chinese Patent Application No. 202110969507.8, filed on Aug. 23, 2021, the entire content of which is incorporated herein by reference.

TECHNICAL FIELD

The present disclosure generally relates to the field of intellectual driving technology, and more particularly, to a method and apparatus for controlling a vehicle, a vehicle and an electronic device.

BACKGROUND

With the development of the intellectual driving technology, it is very important to identify information at a scene where a vehicle is located. Identification of the information at the scene (for example, identifying the road, terrain and obstacle information at the scene) can aid perception, obstacle avoidance, localization and control of the vehicle.

In the related art, the identification of the information of the scene where the vehicle is located is usually achieved by a laser radar, an ultrasonic sensor and deep learning algorithm, so as to aid perception, obstacle avoidance, localization and control of the vehicle.

However, these traditional methods for identification of information at the scene is tedious, which would adversely affect the robustness of the vehicle control method, and in turn, safe operation of the vehicle.

SUMMARY

A method for controlling a vehicle including an image capturing device is provided. The method includes: controlling the image capturing device to collect an image of a scene where the vehicle is located; acquiring projection information of a projection pattern in the image; determining image-altering information corresponding to the projection pattern according to the projection information; and controlling movement of the vehicle according to the image-altering information.

A vehicle includes: a body; a plurality of image capturing devices, configured to collect an image of a scene; and a control apparatus, connected to each of the plurality of image capturing devices, and configured to execute the method for controlling a vehicle as described above.

An electronic device includes: a memory, a processor and a computer program stored in the memory and executable on the processor, wherein the processor when executing the program achieves a method for controlling a vehicle as described above, wherein the vehicle includes an image capturing device, and the processor is configured to: control the image capturing device to collect an image of a scene where the vehicle is located; acquire projection information of a projection pattern in the image; determine image-altering information corresponding to the projection pattern according to the projection information; and control movement of the vehicle according to the image-altering information.

BRIEF DESCRIPTION OF THE DRAWINGS

The above and/or additional aspects and advantages of the present disclosure will become apparent and easily understood from the following description of embodiments in conjunction with the accompanying drawings.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The embodiments described below with reference to the accompanying drawings are illustrative and are only used to explain the present disclosure and should not be construed as limitation of the present disclosure. On the contrary, the embodiments of the present disclosure include all changes, modifications and equivalents falling within the spirit and scope of the appended claims.

Figure 1:
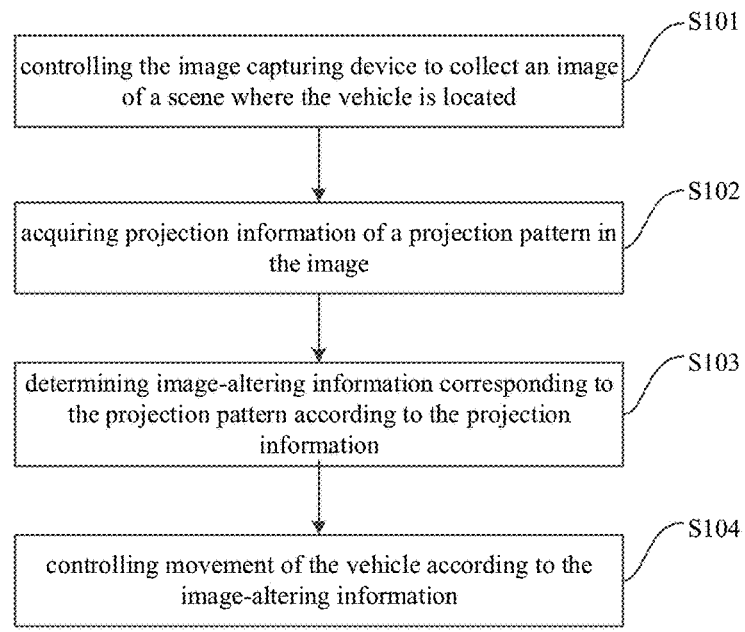
FIG. 1 is a flow chart illustrating a method for controlling a vehicle according to an embodiment of the present disclosure.
Figure 2:
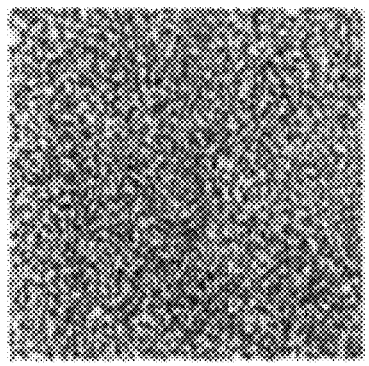
FIG. 2 is a schematic diagram illustrating a random pattern according to an embodiment of the present disclosure.

FIG. 1 is a flow chart illustrating a method for controlling a vehicle according to an embodiment of the present disclosure.

This embodiment is illustrated in that a method for controlling a vehicle is arranged in an apparatus of controlling a vehicle.

In this embodiment, the method for controlling a vehicle may be arranged in an apparatus of controlling a vehicle; the apparatus of controlling a vehicle may be arranged in a server or a mobile terminal, which is not limited by embodiments of the present disclosure.

It should be noted that an execution subject in this embodiment may be for example a central processing unit (hereinafter referred to as CPU) in a server or a mobile terminal as hardware; or may be for example a related background service in a server or a mobile terminal as software, which is not limited herein.

As shown in FIG. 1, the method for controlling a vehicle includes steps S101 to S104.

At the step S101, the image capturing device is controlled to collect an image of a scene where the vehicle is located.

In some embodiments, prior to controlling the image capturing device to collect an image of a scene where the vehicle is located, a projection device may be controlled to project a projection pattern to the scene.

In embodiments of the present disclosure, the projection device may be specifically, for example, a light source having an optical modulation function and arranged in a vehicle (the number of the light sources may be adaptively arranged according to needs of an actual business scenario, which is not limited herein). The light source may also be integrated with a vehicle lamp; the light source may be of a wavelength range of visible light or invisible light such as infrared light, which are not limited herein.

In some other embodiments, the projection device may also be integrated in an image capturing device, thus achieving both a projection function and an image capture function; alternatively, the projection device may also be arranged apart from the vehicle, which is not limited herein.

Figure 3:
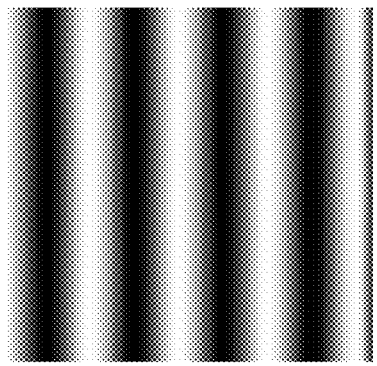
FIG. 3 is a schematic diagram illustrating a sine wave pattern according to an embodiment of the present disclosure.
Figure 4:
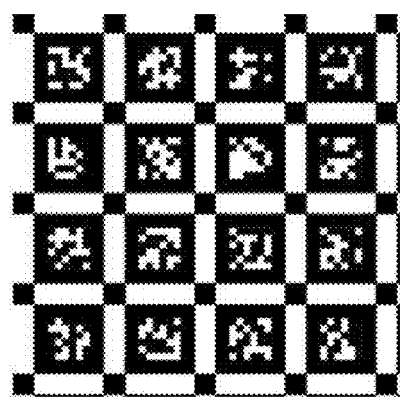
FIG. 4 is a schematic diagram illustrating a two-dimensional code pattern according to an embodiment of the present disclosure.
Figure 5:
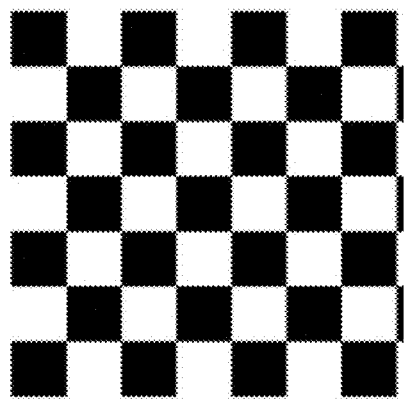
FIG. 5 is a schematic diagram illustrating a grid pattern according to an embodiment of the present disclosure.

The projection device may project a corresponding pattern to the scene where the vehicle is located. Said pattern may also be referred to as the projection pattern, which may be for example a grid pattern, a random coded pattern, a sine wave pattern, a triangular wave pattern, a two-dimensional code pattern (as shown in FIG. 2 to FIG. 5, FIG. 2 is a schematic diagram illustrating a random pattern according to an embodiment of the present disclosure; FIG. 3 is a schematic diagram illustrating a sine wave pattern according to an embodiment of the present disclosure; FIG. 4 is a schematic diagram illustrating a two-dimensional code pattern according to an embodiment of the present disclosure; and FIG. 5 is a schematic diagram illustrating a grid pattern according to an embodiment of the present disclosure), which is not limited herein.

In this embodiment, the image of the scene where the vehicle is located may be obtained when the image capturing device captures the projection pattern projected by the projection device to the scene. That is, the projection device may project a set projection pattern to a projection area in the scene, then the image capturing device captures an image of a scene picture including said projection area. Said image may be referred to as the image of scene where the vehicle is located.

The number of the images of the scene where the vehicle is located may be one or more, which is not limited herein.

In some embodiments, one image capturing device may be arranged to collect a plurality of the images of the scene; alternatively, a plurality of the image capturing devices may be arranged such that individual image capturing devices captures the image of the scene separately to obtain a plurality of the images, which is not limited herein.

At the step S102, projection information of the projection pattern in the image is acquired.

After the image capturing device is controlled to collect the image of the scene where the vehicle is located as described above, projection information of the projection pattern in the image may be acquired.

The image of the scene picture including the projection area captured by the image capturing device may include information related to the projection pattern, which may be referred to as the projection information. The projection information may be specifically, for example, pixel information of the projection pattern, image-altering information of the projection pattern, brightness information of the projection pattern and the like, which is not limited herein.

In some embodiments, acquiring information of a projection pattern in the image may include parsing the image to obtain the projection information of the projection pattern in the image, for example, may further include parsing the projection pattern included in the image to obtain a plurality of pixel coordinates of the projection pattern, and taking the plurality of pixel coordinates as the projection information, which is not limited herein.

Alternatively, the image may also be input into a deep learning model well-trained in advance, to obtain a plurality of pixel coordinates of the projection pattern in the image which are output from the deep learning model; and the plurality of pixel coordinates are taken as the projection information. Alternatively, the projection information of the projection pattern in the image may also be acquired by any other feasible way, which is not limited herein.

At the step S103, image-altering information corresponding to the projection pattern is determined according to the projection information.

After the image is parsed to acquire the projection information of the projection pattern in the image as described above, the image-altering information corresponding to the projection pattern may be determined according to the projection information.

In this embodiment, when controlling the projection device to project the projection pattern to the scene where the vehicle is located, because of a possible presence of an obstacle in the scene where the vehicle is located, the projection pattern projected by the projection device, when falling at the obstacle, will deform to varying degrees due to shadowed by the obstacle. Accordingly, information for describing the deformation of the projection pattern can be referred to as the image-altering information, which may be specifically, for example, a pixel coordinate offset, an angle offset, a size offset and the like of the projection pattern, which is not limited herein.

In some embodiments, determining image-altering information corresponding to the projection pattern according to the projection information may include comparing a deformed projection pattern with an undeformed projection pattern projected by the projection device, to obtain change information of the projection pattern relative to the undeformed projection pattern; and taking the change information as the image-altering information.

For example, taking the projection pattern projected by the projection device being the grid pattern as an example, a deformed grid pattern may be compared with the undeformed grid pattern, to judge offset angle information of the grid, offset size information of the grid and brightness information of the grid pattern. The above described multiple information are taken as the image-altering information, which is not limited herein.

At the step S104, movement of the vehicle is controlled according to the image-altering information.

After the image-altering information corresponding to the projection pattern is determined according to the projection information as described above, movement of the vehicle may be controlled according to the image-altering information.

In other words, after the image-altering information corresponding to the projection pattern is obtained as described above, the movement in different types of the vehicle may be controlled according to the image-altering information of the projection pattern and the scene where the vehicle is located. For example, a parking scene, a driving scene or the like, in combination with the image-altering information of the projection pattern, give a control strategy adapted to a current scene.

In some embodiments, the scene where the vehicle is located is judged. For example, it may judge whether an obstacle is present in the scene where the vehicle is located and an orientation of the obstacle, based on which to control the movement of the vehicle. For example, it may control the vehicle to make avoidance (e.g., detour to left, detour to right, U-turn, and lane change) according to judged position of the obstacle in the scene where the vehicle is located. It may also control the vehicle to decelerate according to judged ground flatness of ground in the scene where the vehicle is located. The corresponding control of the vehicle according to the image-altering information as described above may be referred to as controlling movement, which is not limited herein In some embodiment, controlling movement of the vehicle according to the image-altering information may include controlling the movement of the vehicle according to the brightness information in the image. For example, in the case that the ground of the scene where the vehicle is located is flat, the brightness of the projection pattern in the image is consistent; in the case that the ground of the scene where the vehicle is located is not flat, the brightness of the projection pattern in the image may vary correspondingly, such that the brightness information corresponding to the projection pattern can be parsed, thus controlling the movement of the vehicle.

For example, in the case that the image-altering information of the projection pattern indicates a certain part of the projection pattern projected to a road surface becoming darker, it may be considered that depression may exist there, such that the vehicle may be controlled to make corresponding avoidance; alternatively, in the case that the image-altering information of the projection pattern indicates a certain part of the projection pattern projected to a road surface becoming brighter, it may be considered that a protruding obstacle exists here, such that the vehicle may be controlled to make corresponding avoidance, which is not limited here.

In this embodiment, by controlling the image capturing device to collect the image of the scene where the vehicle is located; acquiring the projection information of the projection pattern in the image; determining the image-altering information corresponding to the projection pattern according to the projection information; and controlling the movement of the vehicle according to the image-altering information, it may effectively aid identification of the relative information of the scene where the vehicle is located, thus effectively increasing accuracy of controlling the movement of the vehicle, enhancing safety of operation of the vehicle, and improving robustness and applicability of the vehicle control method.

Figure 6:
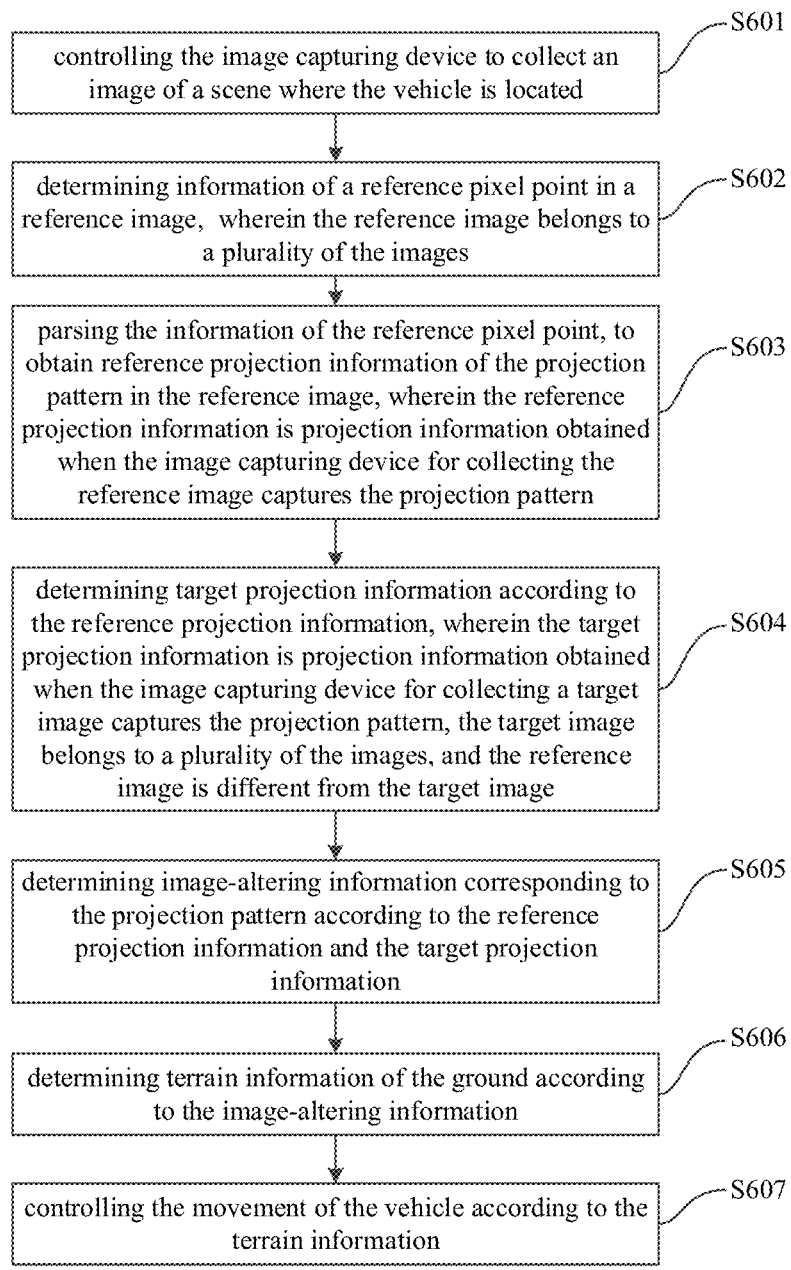
FIG. 6 is a flow chart illustrating a method for controlling a vehicle according to another embodiment of the present disclosure.

FIG. 6 is a flow chart illustrating a method for controlling a vehicle according to another embodiment of the present disclosure As shown in FIG. 6, the method for controlling a vehicle includes steps S601 to S607.

At the step S601, the image capturing device is controlled to collect an image of a scene where the vehicle is located.

The description for the step S601 may refer to the above embodiment for details, which will not be elaborated here.

At the step S602, information of a reference pixel point in a reference image is determined. The reference image belongs to a plurality of the images.

The vehicle may include a plurality of the image capturing devices, for collecting a plurality of the images of the scene where the vehicle is located. The plurality of the image capturing devices may be specifically, for example, a first camera (the first camera is the image capturing device for collecting the reference image) and a second camera (the second camera is the image capturing device for collecting a target image). The image collected by the first camera is different from that by the second camera. In other words, the image collected by the first camera may be taken as the reference image; while the image collected by the second camera may be taken as the target image. The reference image and the target image may be in a correspondingly associating relationship, which may be used to aid controlling of the vehicle, which is not limited herein.

In embodiments of the present disclosure, at least some image capturing devices may be arranged with different collecting angles, such that when collecting the corresponding images by the plurality of the image capturing devices respectively, the images may be collected by controlling the plurality of the image capturing devices at the corresponding different collecting angles respectively (in embodiments of the present disclosure, the plurality of the images may include images of the scene collected by individual image capturing devices). Alternatively, at least some image capturing devices may be arranged with other different image capturing parameters (e.g., a camera internal parameter or a camera external parameter), such that the plurality of the image capturing devices are controlled separately to collect the images with the corresponding multiple image capturing parameters, thereby capturing the plurality of the images of the scene where the vehicle is located based on the different image capturing parameters, thus effectively improving control of the vehicle based on the images of the scene where the vehicle is located.

The image collected by the first camera as described above (the first camera is the image capturing device for collecting the reference image) may be referred to as the reference image. The number of the reference images may be one or more, which is not limited herein.

In this embodiment, the reference image may be obtained when the image capturing device captures the projection pattern projected by the projection device to the scene. In other words, the projection device may project a set projection pattern to a projection area in the scene, then the image capturing device captures an image of a scene picture including said projection area. The image of the scene picture may include information related to the projection area.

The reference image may include a plurality of pixel points, each of which may be referred to as a reference pixel point. Accordingly, information describing the reference pixel point may be referred to as information of the reference pixel point, which may include information about the pixel point itself, and information related to the projection pattern around the pixel point, which is specifically for example a reference pixel point coordinate based on a first camera coordinate system, which is not limited herein.

In some embodiments, determining information of the reference pixel point in the reference image may include determining reference pixel point in the reference image; determining reference pixel point coordinate of the reference pixel point based on the first camera coordinate system; and taking the reference pixel point coordinate as the information of the reference pixel point, which is not limited herein.

At the step S603, the information of the reference pixel point is parsed, to obtain reference projection information of the projection pattern in the reference image. The reference projection information is projection information obtained when the image capturing device for collecting the reference image captures the projection pattern.

The reference projection information is a reference pixel coordinate based on a first camera coordinate system. The first camera coordinate system is a coordinate system of the image capturing device for collecting the reference image.

After the information of the reference pixel point in the reference image is determined as described above, the information of the reference pixel point may be parsed, to obtain the reference projection information of the projection pattern in the reference image. The reference projection information is projection information obtained when the image capturing device for collecting the reference image captures the projection pattern, thereby effectively improving accuracy and reliability of the reference projection information, thus determining the target projection information and the image-altering information more accurately based on the reference projection information.

In other words, after the information of the reference pixel point in the reference image is determined as described above, the information of the reference pixel point may be parsed, to obtain the reference pixel coordinate based on the first camera coordinate system, and the reference pixel coordinate is taken as the reference projection information, and will not be elaborated herein.

At the step S604, the target projection information is determined according to the reference projection information. The target projection information is projection information obtained when the image capturing device for collecting the target image captures the projection pattern, the target image belongs to a plurality of the images, and the reference image is different from the target image.

After the information of the reference pixel point is parsed to obtain the reference projection information of the projection pattern in the reference image as described above, the target projection information may be determined according to the reference projection information, thereby effectively assisting in improvement of accuracy of determining the target pixel information based on the reference projection information, and enhancing referability of the target pixel information in a vehicle control scenario.

The target projection information is projection information obtained when the image capturing device for collecting the target image captures the projection pattern, the target image belongs to a plurality of the images, and the reference image is different from the target image.

The above described image collected by the second camera (the second camera is the image capturing device for collecting the target image) may be referred to as the target image. The number of the target image may be one or more, which is not limited herein.

The target projection information is a target pixel coordinate based on a second camera coordinate system. The second camera coordinate system is a coordinate system of the image capturing device for collecting the target image.

In this embodiment, determining the target projection information according to the reference projection information may include determining the target pixel coordinate of the second camera coordinate system according to the reference pixel coordinate of the first camera coordinate system.

Optionally, in some embodiments, determining the target projection information according to the reference projection information may include determining the target projection information according to the reference projection information and a preset corresponding relationship. Because the target projection information is determined according to the preset corresponding relationship, the accuracy and reliability of the target projection information can be effectively improved, thereby effectively assisting in improvement of accuracy of determining the information of the target pixel point based on the target projection information, and enhancing referability of the information of the target pixel point in scene modelling.

The preset corresponding relationship includes the target projection information corresponding to the reference projection information. The preset corresponding relationship is obtained in advance by calibrating the projection pattern according to a reference image capturing parameter corresponding to the image capturing device for collecting the reference image and a target image capturing parameter of the image capturing device for collecting the target image.

For example, in some embodiments, the image capturing device for collecting the reference image and the image capturing device for collecting the target image may be calibrated, to obtain a corresponding preset relationship represented by the following formulas:

$$\begin{cases} P_{\_cam} = T_{\_cam\_vehicle} \cdot P_{\_i} \\ UV_{\_i} = K_{\_cam} \cdot P_{\_can} \end{cases},$$

where $K_{\_cam}$ is an internal parameter matrix of the image capturing device; $T_{\_cam\_vehicle}$ is an external parameter matrix of the image capturing device; $P_{\_i}$ is a coordinate of a point in a vehicle coordinate system (i.e., a position point in the scene is based on the vehicle coordinate system as a main coordinate system); $P_{\_cam}$ is a coordinate of said position point in an image capturing device coordinate system ($P_{\_cam}$ corresponds to the reference pixel coordinate in the first camera coordinate system; while $P_{\_cam}$ corresponds to the target pixel coordinate in the second camera coordinate system); and $UV_{\_i}$ is a coordinate of the projection pattern (i.e., the projection information, when obtained by the first camera, may be referred to as the reference projection information; when obtained by the second camera, may be referred to as the target projection information).

In other embodiments, the projection device may also be taken as an image capturing device. Accordingly, the projection device may be calibrated to obtain a corresponding preset relationship represented by the following formulas:

$$\begin{cases} P_{\_proj} = T_{\_proj\_vehicle} \cdot P_{\_i} \\ UV_{\_i} = K_{\_proj} \cdot P_{\_proj} \end{cases},$$

where $K_{\_proj}$ is an internal parameter matrix of the projection device; $T_{\_proj\_vehicle}$ is an external parameter matrix of the projection device; $P_{\_i}$ is a coordinate of a point in a vehicle coordinate system; $P_{\_proj}$ is a coordinate of said point in a projection device coordinate system; and $UV_{\_i}$ is a coordinate of the projection pattern.

After the above preset relationship is determined, the coordinate $UV_{\_i}$ of the projection pattern captured by the second camera may be obtained according to the above preset relationship; and said coordinate is taken as the target projection information.

In other embodiments, the target pixel coordinate based on the second camera coordinate system may also be determined according to the target projection information by means of point-to-point matching; and the target pixel coordinate is taken as the target projection information, which is not limited herein.

For example, with respect to a reference pixel coordinate in the first camera coordinate system, as the reference projection information of the projection pattern is projected around $UV_a$, a target pixel coordinate $UV_b$ in the second camera coordinate system, matching the reference pixel coordinate $UV_a$, may be determined by template matching, intensity matching, and other comprehensive approaches. Besides, as an optical model of the projection device is consistent with that of the camera, the projection device may be taken as a camera, participating in the point-to-point matching, so that all pixel points are matched to obtain the target pixel coordinate $UV_b$ in the second camera coordinate system, matching the reference pixel coordinate $UV_a$; and the target pixel coordinate is taken as the target projection information.

After the target projection information (the target pixel coordinate based on the second camera coordinate system) is determined according to the reference projection information (the reference pixel coordinate based on the first camera coordinate system) by means of the point-to-point matching as described above, a group of matching points $IR_j$ ($UV_a$, $UV_b$, $UV_c$, ...) that are successfully matched are recorded, where a, b, c, ... represent different cameras; one group of matching points at least includes two points, which is not limited herein.

At the step S605, the image-altering information corresponding to the projection pattern is determined according to the reference projection information and the target projection information.

Figure 7:
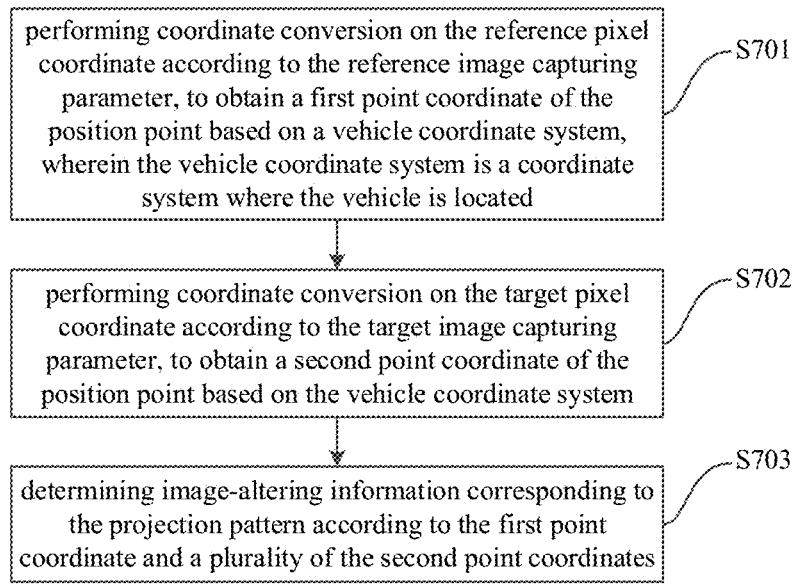
FIG. 7 is a flow chart illustrating a method for controlling a vehicle according to still another embodiment of the present disclosure.

Optionally, in some embodiments, as shown in FIG. 7, a flow chart illustrating a method for controlling a vehicle according to still another embodiment of the present disclosure, determining the image-altering information corresponding to the projection pattern according to the reference projection information and the target projection information includes steps S701 to S703.

At the step S701, coordinate conversion is performed on the reference pixel coordinate according to the reference image capturing parameter, to obtain a first point coordinate of the position point based on a vehicle coordinate system, wherein the vehicle coordinate system is a coordinate system where the vehicle is located.

After the coordinate conversion is performed on the reference pixel coordinate according to the reference image capturing parameter, the coordinate of the position point based on the vehicle coordinate system may be obtained, and said coordinate may be referred to as the first point coordinate.

In this embodiment, performing the coordinate conversion on the reference pixel coordinate according to the reference image capturing parameter to obtain the first point coordinate of the position point based on the vehicle coordinate system may be determined according to an associating relationship between the reference image capturing parameter, the reference pixel coordinate and the first point coordinate. The associating relationship is represented by:

$$uv_a = K_a \cdot T_a \cdot P_i,$$

where $P_i$ is the first point coordinate of the position point based on the vehicle coordinate system; $T_a$ is an external parameter calibration matrix of the first camera; $K_a$ is an internal parameter calibration matrix of the first camera, where the external parameter calibration matrix $T_a$ and the internal parameter calibration matrix $K_a$ each may be referred to as the reference image capturing parameter as described above; and $uv_a$ represents the reference pixel coordinate of the position point based on the first camera coordinate system.

At the step S702, coordinate conversion is performed on the target pixel coordinate according to the target image capturing parameter, to obtain a second point coordinate of the position point based on the vehicle coordinate system.

After the coordinate conversion is performed on the target pixel coordinate according to the target image capturing parameter, the coordinate of the position point based on the vehicle coordinate system may be obtained, and said coordinate may be referred to as the second point coordinate.

In this embodiment, performing the coordinate conversion on the target pixel coordinate according to the target image capturing parameter to obtain the second point coordinate of the position point based on the vehicle coordinate system may be determined according to an associating relationship between the target image capturing parameter, the target pixel coordinate and the second point coordinate. The associating relationship is represented by:

$$uv_b = K_b \cdot T_b \cdot p_i,$$

where $P_i$ is the second point coordinate of the position point based on the vehicle coordinate system; $T_b$ is an external parameter calibration matrix of the second camera; $K_b$ is an internal parameter calibration matrix of the second camera, where the external parameter calibration matrix $T_b$ and the internal parameter calibration matrix $K_b$ each may be referred to as the target image capturing parameter as described above; and $uv_b$ represents the target pixel coordinate of the position point based on the second camera coordinate system.

At the step S703, the image-altering information corresponding to the projection pattern is determined according to the first point coordinate and a plurality of the second point coordinates.

Optionally, in some embodiments, determining the image-altering information corresponding to the projection pattern according to the first point coordinate and the plurality of the second point coordinates may include generating point cloud data corresponding to the position point according to the first point coordinate and the plurality of the second point coordinates; and determining the image-altering information corresponding to the projection pattern according to a plurality of the point cloud data corresponding to a plurality of the position points in the scene. Because the image-altering information corresponding to the projection pattern is determined according to the point cloud data corresponding to the position point, determination of the image-altering information can be provided with a new dimension, thus effectively improving accuracy and reliability of the image-altering information.

A collection of the plurality of the point data may be referred to as the point cloud data.

In some embodiments, generating point cloud data corresponding to the position point according to the first point coordinate and the plurality of the second point coordinates may include generating a point cloud plot corresponding to the position point according to the first point coordinate and the plurality of the second point coordinates, and taking the point cloud plot as the point cloud data corresponding to the position point, which is not limited herein.

After the point cloud data corresponding to the position point is generated according to the first point coordinate and the plurality of the second point coordinates as described above, the image-altering information corresponding to the projection pattern may be determined according to the plurality of the point cloud data corresponding to the plurality of the position points in the scene.

In this embodiment, a three-dimensional model of the scene may be built according to the plurality of the point cloud data respectively corresponding to the plurality of the position points in the scene, thus determining the image-altering information corresponding to the projection pattern by the three-dimensional model of the scene, which is not limited herein.

Of course, determining the image-altering information corresponding to the projection pattern according to the first point coordinate and the plurality of the second point coordinates may also be achieved by any other approaches, such as an artificial intelligence approach, an engineering approach, a mathematical analysis approach, which is not limited herein.

In this embodiment, by performing the coordinate conversion on the reference pixel coordinate according to the reference image capturing parameter to obtain the first point coordinate of the position point based on the vehicle coordinate system, wherein the vehicle coordinate system is a coordinate system where the vehicle is located; and performing the coordinate conversion on the target pixel coordinate according to the target image capturing parameter to obtain the second point coordinate of the position point based on the vehicle coordinate system; and determining the image-altering information corresponding to the projection pattern according to the first point coordinate and the plurality of the second point coordinates, accuracy of the image-altering information can be effectively increased, so that it is possible to judge the obstacle existing in the scene where in the vehicle is based on the image-altering information, thus effectively improving control of the vehicle.

At the step S606, terrain information of ground is determined according to the image-altering information.

After the projection information corresponding to the projection pattern is determined as described above, the terrain information of ground may be determined according to the image-altering information.

Optionally, in some embodiments, determining terrain information of ground according to the image-altering information may include determining ground flatness of the ground according to the image-altering information; and/or determining a ground slope of the ground according to the image-altering information; and/or determining traffic sign information on the ground according to the image-altering information, wherein at least one of the ground flatness, the ground slope and the traffic sign information is taken as the terrain information, thereby effectively increasing accuracy of determining the terrain information, and thus improving control of individual procedures of vehicle driving based on the terrain information.

At the step S607, the movement of the vehicle is controlled according to the terrain information.

In some embodiments, controlling movement of the vehicle according to the terrain information includes: controlling a moving speed of the vehicle according to the above determined ground flatness, thus improving drive comfortability; providing references for controlling an accelerated speed and a torque during the movement of the vehicle according to the above determined ground slope; and providing a support for a driving decision such as turning and stopping of the vehicle according the above determined traffic sign information (such as a lane line, a stop line and an arrow).

In this embodiment, by determining the terrain information of the ground according to the image-altering information; and controlling the movement of the vehicle according to the terrain information, as the corresponding control of the vehicle is made according to the terrain information, it can make a more accurate decision for the vehicle against different terrain information, thus effectively enhancing safety of operation of the vehicle, and effectively improving control of the vehicle.

Optionally, in some other embodiment, controlling the movement of the vehicle may further include: determining shape information and position information of a target object according to the above determined image-altering information; and controlling the vehicle to avoid an obstacle according to the shape information and the position information, so that it may bring about significant improvement in perception, obstacle avoidance, control of the vehicle, thereby effectively improving obstacle avoiding effect of the vehicle in different operating scenes, and thus effectively enhancing drive comfortability of the vehicle.

The target object refers to an obstacle in the scene where the vehicle is located (for example, a curb, a wall and a tree trunk). Accordingly, information reflecting a shape of the target object may be referred to as the shape information (the shape information may be specifically for example a height, a width and a depression degree of the obstacle); information reflecting a position of the target object may be referred to as the position information (the position information may be specifically for example an orientation and a distance of the obstacle).

In other words, the shape information and the position information of the obstacle may be determined according to the image-altering information, thereby controlling the vehicle to avoid the obstacle in different vehicle operating scenes according to the shape information and the position information. Some examples are given below.

(1) In a parking scene, according to the image-altering information, determining the shape information and the position information of the obstacle, including: a wheel block, a curb, a wall, a tree trunk, etc., to aid the vehicle to make reasonable avoidance when parking, thus achieving accurate parking.

(2) In a driving scene, according to the image-altering information, determining the shape information and the position information of the obstacle, including: a road edge, a manhole cover, a road pothole, a fence, a vehicle in a close distance, etc., to aid the vehicle to make reasonable avoidance when driving, thus improving drive comfortability.

In this embodiment, the image capturing device is controlled to collect the image of the scene where the vehicle is located; the information of the reference pixel point in the reference image is determined, before the information of the reference pixel point is parsed, to obtain the reference projection information of the projection pattern in the reference image, where the reference projection information is the projection information obtained when the image capturing device for collecting the reference image captures the projection pattern, thereby effectively increasing accuracy and reliability of the reference projection information, so that the target projection information and the image-altering information can be determined more accurately based on the reference projection information. After the information of the reference pixel point is parsed to obtain the reference projection information of the projection pattern in the reference image, the target projection information can be determined according to the reference projection information, thereby effectively assisting in improvement of accuracy of determining the target pixel information based on the reference projection information, thus enhancing referability of the target pixel information in the vehicle control scenario. The image-altering information corresponding to the projection pattern is determined according to the reference projection information and the target projection information; the terrain information of the ground is determined according to the image-altering information; and the movement of the vehicle is controlled according to the terrain information, as the corresponding control of the vehicle is made according to the terrain information, it is possible to make a more accurate decision for the vehicle against different terrain information, thus effectively enhancing safety of operation of the vehicle, and effectively improving control of the vehicle.

Figure 8:
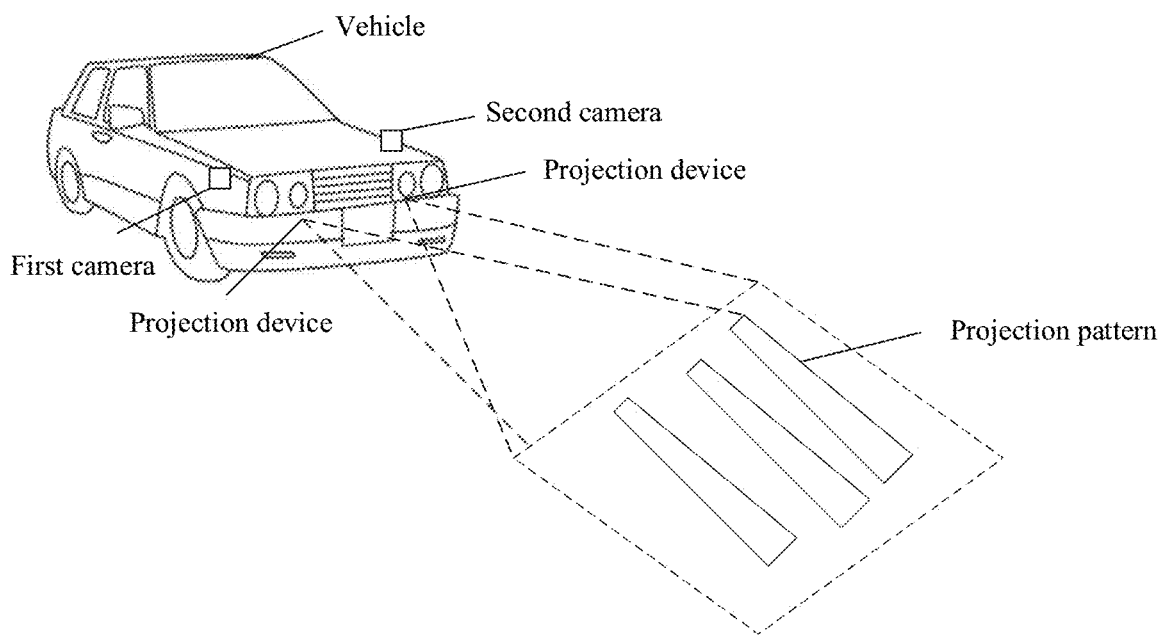
FIG. 8 is a schematic diagram illustrating an application scenario of a method for controlling a vehicle according to an embodiment of the present disclosure.

In this embodiment, as shown in FIG. 8, a schematic diagram illustrating an application scenario of a method for controlling a vehicle according to an embodiment of the present disclosure, including a vehicle (the coordinate system where the vehicle is located is referred to as the vehicle coordinate system, which may be specifically for example a coordinate system established with a certain point on the vehicle as the original point); a projection device, configured to project a projection pattern (the projection pattern is projected into the dotted box at the projection angle indicated by the dotted line as shown in FIG. 8) to a scenario where the vehicle is located; and an image capturing device composed of multiple cameras, like the first camera (the coordinate system where the first camera is located may be referred to as the first camera coordinate system, which may be specifically, for example, a coordinate system established with the focus center of the first camera as the original point) and the second camera (the coordinate system where the second camera is located may be referred to as the second camera coordinate system, which may be specifically, for example, a coordinate system established with the focus center of the second camera as the original point), where the image capturing device is configured to capture the plurality of images of the projection pattern projected by the projection device, such that control of the movement of the vehicle is achieved by parsing the plurality of the images.

Figure 9:
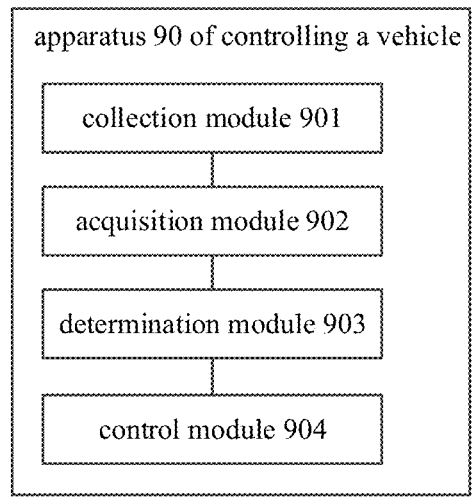
FIG. 9 is a block diagram of an apparatus of controlling a vehicle according to an embodiment of the present disclosure.

FIG. 9 is a block diagram of an apparatus of controlling a vehicle according to an embodiment of the present disclosure.

The vehicle includes an image capturing device.

As shown in FIG. 9, the apparatus 90 of controlling a vehicle includes:
a collection module 901, configured to control the image capturing device to collect an image of a scene where the vehicle is located;
an acquisition module 902, configured to acquire projection information of a projection pattern in the image;
a determination module 903, configured to determine image-altering information corresponding to the projection pattern according to the projection information; and
a control module 904, configured to control movement of the vehicle according to the image-altering information.

In some embodiments of the present disclosure, wherein the vehicle includes a plurality of the image capturing devices, and the acquisition module 902 is specifically configured to:
determine information of a reference pixel point in a reference image, wherein the reference image belongs to a plurality of the images; and
parse the information of the reference pixel point, to obtain reference projection information of the projection pattern in the reference image, wherein the reference projection information is projection information obtained when the image capturing device for collecting the reference image captures the projection pattern.

Figure 10:
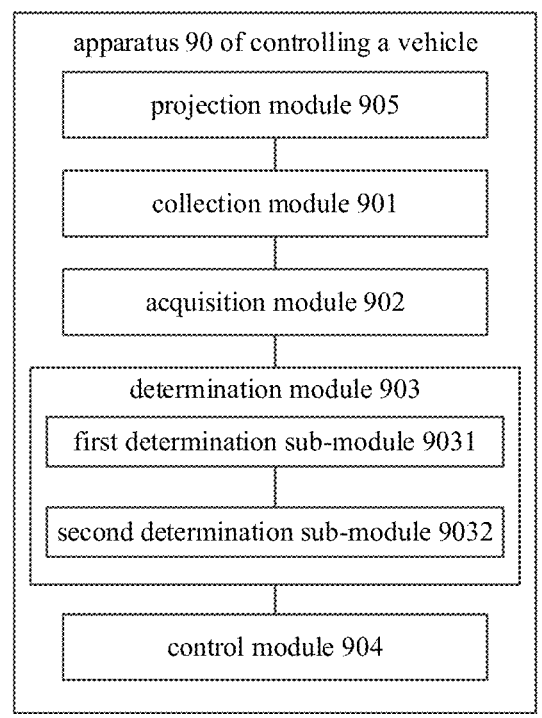
FIG. 10 is a block diagram of an apparatus of controlling a vehicle according to another embodiment of the present disclosure.

In some embodiments of the present disclosure, as shown in FIG. 10, a block diagram of an apparatus of controlling a vehicle according to another embodiment of the present disclosure. The determination module 903 includes:
a first determination sub-module 9031, configured to determine target projection information according to the reference projection information, wherein the target projection information is projection information obtained when the image capturing device for collecting a target image captures the projection pattern, the target image belongs to a plurality of the images, and the reference image is different from the target image; and
a second determination sub-module 9032, configured to determine the image-altering information corresponding to the projection pattern according to the reference projection information and the target projection information.

In some embodiments of the present disclosure, wherein the first determination sub-module 9031 is specifically configured to:
determine the target projection information according to the reference projection information and a preset corresponding relationship,
wherein the preset corresponding relationship includes target projection information corresponding to the reference projection information,
wherein the preset corresponding relationship is obtained in advance by calibrating the projection pattern according to a reference image capturing parameter corresponding to the image capturing device for collecting the reference image and a target image capturing parameter of the image capturing device for collecting the target image.

In some embodiments of the present disclosure, wherein the vehicle further includes a projection device, as shown in FIG. 10, the apparatus 90 further includes:
a projection module 905, configured to control the projection device to project the projection pattern to the scene.

In some embodiments of the present disclosure, wherein the reference projection information is a reference pixel coordinate based on a first camera coordinate system, wherein the first camera coordinate system is a coordinate system of the image capturing device for collecting the reference image; and
the target projection information is a target pixel coordinate based on a second camera coordinate system, wherein the second camera coordinate system is a coordinate system of the image capturing device for collecting the target image.

In some embodiments of the present disclosure, wherein the reference pixel point and a target pixel point respectively correspond to a position point in a space of the scene,
wherein the second determination sub-module 9032 is specifically configured to:
perform coordinate conversion on the reference pixel coordinate according to the reference image capturing parameter, to obtain a first point coordinate of the position point based on a vehicle coordinate system, wherein the vehicle coordinate system is a coordinate system where the vehicle is located;

perform coordinate conversion on the target pixel coordinate according to the target image capturing parameter, to obtain a second point coordinate of the position point based on the vehicle coordinate system; and determine the image-altering information corresponding to the projection pattern according to the first point coordinate and a plurality of the second point coordinates.

In some embodiments of the present disclosure, wherein the second determination sub-module 9032 is specifically configured to:

generate point cloud data corresponding to the position point according to the first point coordinate and a plurality of the second point coordinates; and determine the image-altering information corresponding to the projection pattern according to a plurality of the point cloud data respectively corresponding to a plurality of the position points in the scene.

In some embodiments of the present disclosure, wherein the position point is located on ground in the scene, and wherein the control module 904 is specifically configured to:

determine terrain information of the ground according to the image-altering information; and control the vehicle to avoid an obstacle according to the terrain information.

In some embodiments of the present disclosure, wherein the control module 904 is specifically configured to determine at least one of:

ground flatness of the ground according to the image-altering information;

a ground slope of the ground according to the image-altering information; and traffic sign information on the ground according to the image-altering information, wherein at least one of the ground flatness, the ground slope and the traffic sign information is taken as the terrain information.

In some embodiments of the present disclosure, wherein the position point is located at a target object in the scene, and wherein the control module 904 is specifically configured to:

determine shape information and position information of the target object according to the image-altering information; and control the vehicle to avoid an obstacle according to the shape information and the position information.

It should be noted that explanation and illustration for the above embodiments of the method for controlling a vehicle are also applicable for the embodiments of the apparatus of controlling a vehicle, which will not be elaborated herein.

In these embodiments, the image capturing device is controlled to collect the image of the scene where the vehicle is located; the projection information of the projection pattern in the image is acquired; the image-altering information corresponding to the projection pattern is determined according to the projection information; and the movement of the vehicle is controlled according to the image-altering information, thereby achieving assistance in identification of scene information using identified projection information, thus effectively assisting in identification of related information of the scene where the vehicle is located, effectively increasing accuracy of controlling the movement of the vehicle, enhancing safety of operation of the vehicle, and improving robustness and applicability for the vehicle control method.

Figure 11:
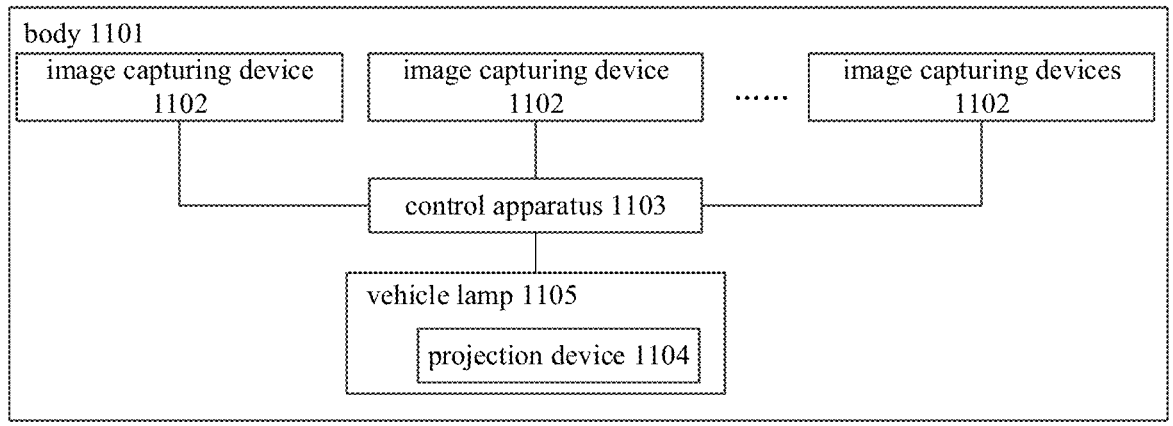
FIG. 11 is a block diagram of a vehicle according to an embodiment of the present disclosure.

FIG. 11 is a block diagram of a vehicle according to an embodiment of the present disclosure.

As shown in FIG. 11, the vehicle 110 includes:

a body 1101;

a plurality of image capturing devices 1102, each configured to collect an image of a scene; and a control apparatus 1103, connected to each of the plurality of image capturing devices, and configured to execute the method for controlling a vehicle in any of the above embodiments.

In some embodiments of the present disclosure, the vehicle 110 further includes:

a projection device 1104, connected to the control apparatus 1103, wherein the control apparatus 1103 is further configured to control the projection device 1104 to project a projection pattern to the scene, wherein the projection pattern is used to control movement of the vehicle 110.

In some embodiments of the present disclosure, the vehicle 110 further includes:

a vehicle lamp 1105 for illumination, wherein the projection device 1104 is integrated with the vehicle lamp 1105.

It should be noted that explanation and illustration for the above embodiments of the method for controlling a vehicle are also applicable for the embodiments of the vehicle 110, which will not be elaborated herein.

In these embodiments, the vehicle is provided with the body; the plurality of the image capturing devices each of which is configured to collect the image of the scene; and the control apparatus which is connected to each of the plurality of image capturing devices and configured to execute the method for controlling a vehicle as described above, thereby achieving assistance in identification of scene information using identified projection information, thus effectively assisting in identification of related information of the scene where the vehicle is located, effectively increasing accuracy of controlling the movement of the vehicle, enhancing safety of operation of the vehicle, and improving robustness and applicability for the vehicle control method.

Figure 12:
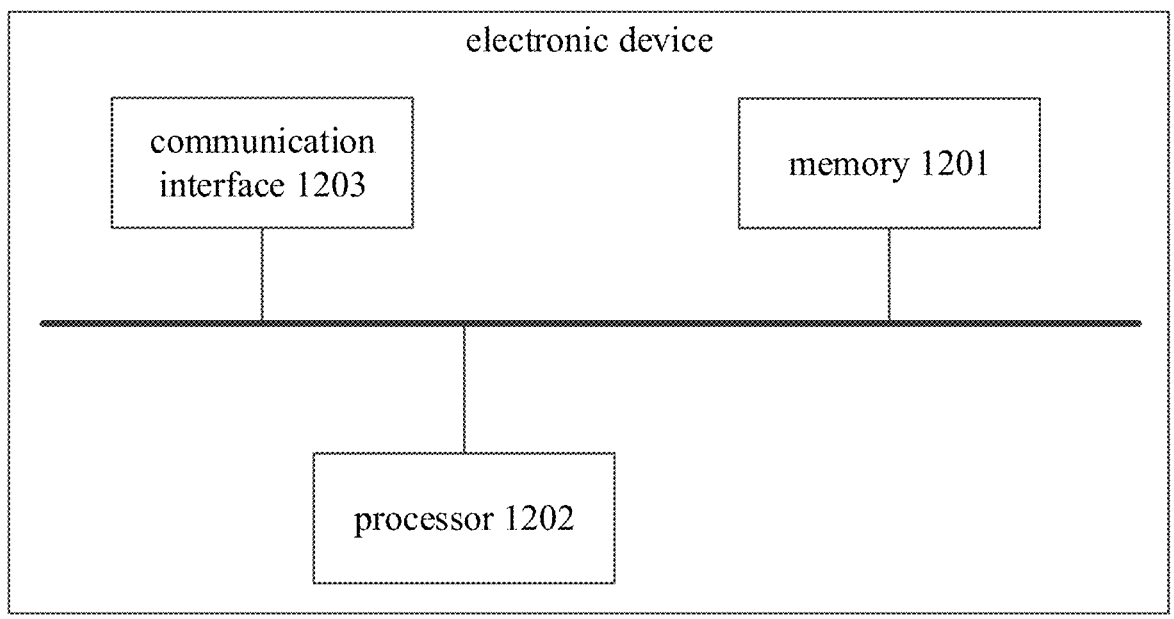
FIG. 12 is a block diagram of an electronic device according to an embodiment of the present disclosure.

FIG. 12 is a block diagram of an electronic device according to an embodiment of the present disclosure.

The electronic device includes:

a memory 1201, a processor 1202 and a computer program stored in the memory 1201 and executable on the processor 1202.

The processor 1202, when executing the program, achieves the method for controlling a vehicle provided in embodiments as described above, the vehicle includes an image capturing device, wherein the processor 1202 is configured to:

control the image capturing device to collect an image of a scene where the vehicle is located;

acquire projection information of a projection pattern in the image;

determine image-altering information corresponding to the projection pattern according to the projection information; and control movement of the vehicle according to the image-altering information.

In a possible implementation, the electronic device further includes:
- a communication interface 1203, configured for communication between the memory 1201 and the processor 1202.

In some embodiments of the present disclosure, the vehicle includes a plurality of the image capturing devices, and the processor 1202 is configured to acquire projection information of a projection pattern in the image by:
- determining information of a reference pixel point in a reference image, wherein the reference image belongs to a plurality of the images; and
- parsing the information of the reference pixel point, to obtain reference projection information of the projection pattern in the reference image, wherein the reference projection information is projection information obtained when the image capturing device for collecting the reference image captures the projection pattern.

In some embodiments of the present disclosure, the processor 1202 is configured to:
- determine target projection information according to the reference projection information, wherein the target projection information is projection information obtained when the image capturing device for collecting a target image captures the projection pattern, the target image belongs to a plurality of the images, and the reference image is different from the target image; and
- determine the image-altering information corresponding to the projection pattern according to the reference projection information and the target projection information.

In some embodiments of the present disclosure, the processor 1202 is configured to:
- determine the target projection information according to the reference projection information and a preset corresponding relationship,
  wherein the preset corresponding relationship includes target projection information corresponding to the reference projection information,
  wherein the preset corresponding relationship is obtained in advance by calibrating the projection pattern according to a reference image capturing parameter corresponding to the image capturing device for collecting the reference image and a target image capturing parameter of the image capturing device for collecting the target image.

In some embodiments of the present disclosure, the vehicle further includes a projection device, and the processor 1202 is further configured to
- control the projection device to project the projection pattern to the scene, prior to control the image capturing device to collect an image of a scene where the vehicle is located.

In some embodiments of the present disclosure, the reference projection information is a reference pixel coordinate based on a first camera coordinate system, wherein the first camera coordinate system is a coordinate system of the image capturing device for collecting the reference image; and
the target projection information is a target pixel coordinate based on a second camera coordinate system, wherein the second camera coordinate system is a coordinate system of the image capturing device for collecting the target image.

In some embodiments of the present disclosure, the reference pixel point and a target pixel point respectively correspond to a position point in a space of the scene,
the processor 1202 is configured to:
- perform coordinate conversion on the reference pixel coordinate according to the reference image capturing parameter, to obtain a first point coordinate of the position point based on a vehicle coordinate system, wherein the vehicle coordinate system is a coordinate system where the vehicle is located;
- perform coordinate conversion on the target pixel coordinate according to the target image capturing parameter, to obtain a second point coordinate of the position point based on the vehicle coordinate system; and
- determine the image-altering information corresponding to the projection pattern according to the first point coordinate and a plurality of the second point coordinates.

In some embodiments of the present disclosure, the processor 1202 is configured to
- generate point cloud data corresponding to the position point according to the first point coordinate and the plurality of the second point coordinates; and
- determine the image-altering information corresponding to the projection pattern according to a plurality of the point cloud data respectively corresponding to a plurality of the position points in the scene.

In some embodiments of the present disclosure, the position point is located on ground in the scene,
the processor 1202 is configured to controlling movement of the vehicle according to the image-altering information by:
- determining terrain information of the ground according to the image-altering information; and
- controlling the movement of the vehicle according to the terrain information.

In some embodiments of the present disclosure, the processor 1202 is configured to:
- determine ground flatness of the ground according to the image-altering information;
- determine a ground slope of the ground according to the image-altering information; and
- determine traffic sign information on the ground according to the image-altering information,
  wherein at least one of the ground flatness, the ground slope and the traffic sign information is taken as the terrain information.

In some embodiments of the present disclosure, the position point is located at a target object in the scene,
the processor 1202 is configured to controlling movement of the vehicle according to the image-altering information by:
- determining shape information and position information of the target object according to the image-altering information; and
- controlling the vehicle to avoid an obstacle according to the shape information and the position information.

The memory 1201 is configured to store the computer program executable on the processor 1202.

The memory 1201 may include a high-speed Random Access Memory (referred to as a RAM memory hereinafter), or a non-volatile memory, for example at least one disk memory.

The processor 1202 is configured to achieve the method for controlling a vehicle as described in the above embodiments when executing the program.

In the case that the memory 1201, the processor 1202 and the communication interface 1203 are implemented independently, the memory 1201, the processor 1202 and the communication interface 1203 may be connected mutually by a bus and achieve mutual communication. The bus may be an Industry Standard Architecture (hereinafter referred to as ISA) bus, a Peripheral Component Interconnect (hereinafter referred to as PCI) bus, an Extended Industry Standard Architecture (hereinafter referred to as EISA) bus, or the like. The bus may be divided into an address bus, a data bus, a control bus, etc. For ease of presentation, only one thick line is given in FIG. 12, but it does not mean that there is only one bus or one type of the bus.

Optionally, for a specific implementation, in the case that the memory 1201, the processor 1202 and the communication interface 1203 are integrated on one chip, the memory 1201, the processor 1202 and the communication interface 1203 may achieve mutual communication via an internal interface.

The processor 1202 may be a Central Processing Unit (hereinafter referred to as CPU), an Application Specific Integrated Circuit (hereinafter referred to as ASIC), or configured to one or more integrated circuits for implementing embodiments of the present disclosure.

The present disclosure further provides in embodiments a computer-readable storage medium having stored therein a computer program that, when executed by a processor, achieves a method for controlling a vehicle as described above.

In order to achieve the above embodiments, the present disclosure further provides in embodiments a computer program product, in which instructions in the computer program product, when executed by a processor, achieves a method for controlling a vehicle as described in any of the above embodiments.

It should be noted that, in the description of the present disclosure, terms such as "first" and "second" are used herein for purposes of description and are not intended to indicate or imply relative importance. Besides, in the description of the present disclosure, "a plurality of" means two or more than two this features, unless specified otherwise.

Any procedure or method described in the flow charts or described in any other way herein may be understood to includes one or more modules, portions or parts for storing executable codes that realize particular logic functions or procedures. Moreover, advantageous embodiments of the present disclosure include other implementations in which the order of execution is different from that which is depicted or discussed, including executing functions in a substantially simultaneous manner or in an opposite order according to the related functions. This should be understood by those skilled in the art to which embodiments of the present disclosure belong.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A method for controlling a vehicle comprising a plurality of image capturing devices and a projection device, the method comprising:

controlling the projection device to project a projection pattern to a scene where the vehicle is located;

controlling one of the plurality of image capturing devices to collect a reference image of the scene;

determining information of a reference pixel point in the reference image, wherein the reference image belongs to a plurality of images, and the information of the reference pixel point comprises a reference pixel point coordinate of the reference pixel point based on a first camera coordinate system;

parsing the information of the reference pixel point, to obtain reference projection information of the projection pattern in the reference image, wherein the reference projection information is projection information obtained when the image capturing device for collecting the reference image captures the projection pattern;

determining image-altering information corresponding to the projection pattern according to the projection information; and
controlling movement of the vehicle according to the image-altering information;
wherein controlling movement of the vehicle according to the image-altering information comprises:
determining terrain information of ground according to the image-altering information; and
controlling the movement of the vehicle according to the terrain information;
wherein at least one of ground flatness, a ground slope or traffic sign information is taken as the terrain information;
wherein determining image-altering information corresponding to the projection pattern according to the projection information comprises:
determining target projection information according to the reference projection information and a preset corresponding relationship, wherein the target projection information is projection information obtained when the image capturing device for collecting a target image captures the projection pattern, the target image belongs to the plurality of the images, and the reference image is different from the target image; wherein the target projection information is a target pixel coordinate in the target image based on a second camera coordinate system;
performing coordinate conversion on the reference pixel coordinate according to a reference image capturing parameter, to obtain a first point coordinate of a position point based on a vehicle coordinate system, wherein the vehicle coordinate system is a coordinate system where the vehicle is located;
performing coordinate conversion on the target pixel coordinate according to a target image capturing parameter, to obtain a second point coordinate of the position point based on the vehicle coordinate system;
generating point cloud data corresponding to the position point according to the first point coordinate and the second point coordinate; and
determining the image-altering information corresponding to the projection pattern according to a plurality of the point cloud data respectively corresponding to a plurality of the position points in the scene;
wherein the reference projection information is a reference pixel coordinate based on a first camera coordinate system, wherein the first camera coordinate system is a coordinate system of the image capturing device for collecting the reference image; and the target projection information is a target pixel coordinate based on a second camera coordinate system, wherein the second camera coordinate system is a coordinate system of the image capturing device for collecting the target image;
wherein the reference pixel point and a target pixel point respectively correspond to a position point in a space of the scene.

2. The method according to claim 1, wherein determining terrain information of the ground according to the image-altering information comprises at least one of:
determining the ground flatness of the ground according to the image-altering information;
determining the ground slope of the ground according to the image-altering information; or
determining the traffic sign information on the ground according to the image-altering information.

3. The method of claim 1, wherein the preset corresponding relationship is obtained by:

$$\begin{cases} P_{\_cam} = T_{\_cam\_vehicle} \bullet P_{\_i} \\ UV_{\_i} = K_{\_cam} \bullet P_{\_cam} \end{cases},$$

where $K_{\_cam}$ is an internal parameter matrix of the image capturing device; $T_{\_cam\_vehicle}$ is an external parameter matrix of the image capturing device; $P_{\_i}$ is a coordinate of a point in a vehicle coordinate system; $P_{\_cam}$ is a coordinate of the position point in an image capturing device coordinate system; and $UV_{\_i}$ is a coordinate of the projection pattern; wherein the vehicle coordinate system is a coordinate system where the vehicle is located, and the image capturing device coordinate system is a coordinate system of the image capturing device for collecting the reference image.

4. A vehicle, comprising:
a body;
a plurality of image capturing devices, configured to collect an image of a scene where the vehicle is located;
a projection device, configured to project a projection pattern to the scene
a processor; and
a memory configured to store instructions executable by the processor; wherein the processor is configured to:
control the projection device to project the projection pattern to the scene;
control one of the plurality of image capturing devices to collect a reference image of the scene where the vehicle is located;
determine information of a reference pixel point in the reference image, wherein the reference image belongs to a plurality of images, and the information of the reference pixel point comprises a reference pixel point coordinate of the reference pixel point based on a first camera coordinate system;
parse the information of the reference pixel point, to obtain reference projection information of the projection pattern in the reference image, wherein the reference projection information is projection information obtained when the image capturing device for collecting the reference image captures the projection pattern;
determine image-altering information corresponding to the projection pattern according to the projection information; and
control movement of the vehicle according to the image-altering information; wherein the processor is configured to:
determine terrain information of ground according to the image-altering information; and
control the movement of the vehicle according to the terrain information;
wherein at least one of ground flatness, a ground slope or traffic sign information is taken as the terrain information;
wherein when determines the image-altering information corresponding to the projection pattern according to the projection information, the processor is configured to:
determine target projection information according to the reference projection information and a preset corresponding relationship, wherein the target projection information is projection information obtained when the image capturing device for collecting a target image captures the projection pattern, the target image belongs to the plurality of the images, and the reference image is different from the target image; wherein the target projection information is a target pixel coordinate in the target image based on a second camera coordinate system; and perform coordinate conversion on the reference pixel coordinate according to a reference image capturing parameter, to obtain a first point coordinate of a position point based on a vehicle coordinate system, wherein the vehicle coordinate system is a coordinate system where the vehicle is located;

perform coordinate conversion on the target pixel coordinate according to a target image capturing parameter, to obtain a second point coordinate of the position point based on the vehicle coordinate system;

generate point cloud data corresponding to the position point according to the first point coordinate and the second point coordinate; and determine the image-altering information corresponding to the projection pattern according to a plurality of the point cloud data respectively corresponding to a plurality of the position points in the scene;

wherein the reference projection information is a reference pixel coordinate based on a first camera coordinate system, wherein the first camera coordinate system is a coordinate system of the image capturing device for collecting the reference image; and the target projection information is a target pixel coordinate based on a second camera coordinate system, wherein the second camera coordinate system is a coordinate system of the image capturing device for collecting the target image;

wherein the reference pixel point and a target pixel point respectively correspond to a position point in a space of the scene.

5. The vehicle according to claim 4, further comprising: a vehicle lamp for illumination,
wherein the projection device is integrated with the vehicle lamp.

6. An electronic device, comprising:
a memory;
a processor; and
a computer program stored in the memory and executable on the processor,
wherein the processor when executing the program achieves a method for controlling a vehicle, wherein the vehicle comprises an image capturing device and a projection device, wherein the processor is configured to:
control the projection device to project a projection pattern to a scene where the vehicle is located;
control one of the plurality of image capturing devices to collect a reference image of the scene;
determine information of a reference pixel point in the reference image, wherein the reference image belongs to a plurality of images, and the information of the reference pixel point comprises a reference pixel point coordinate of the reference pixel point based on a first camera coordinate system;
parse the information of the reference pixel point, to obtain reference projection information of the projection pattern in the reference image, wherein the reference projection information is projection information obtained when the image capturing device for collecting the reference image captures the projection pattern;
determine image-altering information corresponding to the projection pattern according to the projection information; and
control movement of the vehicle according to the image-altering information;

wherein controlling movement of the vehicle according to the image-altering information comprises:
determining terrain information of ground according to the image-altering information; and
controlling the movement of the vehicle according to the terrain information;
wherein at least one of ground flatness, a ground slope or traffic sign information is taken as the terrain information;
wherein when determines the image-altering information corresponding to the projection pattern according to the projection information, the processor is configured to:
determine target projection information according to the reference projection information and a preset corresponding relationship, wherein the target projection information is projection information obtained when the image capturing device for collecting a target image captures the projection pattern, the target image belongs to the plurality of the images, and the reference image is different from the target image; wherein the target projection information is a target pixel coordinate in the target image based on a second camera coordinate system; and perform coordinate conversion on the reference pixel coordinate according to a reference image capturing parameter, to obtain a first point coordinate of a position point based on a vehicle coordinate system, wherein the vehicle coordinate system is a coordinate system where the vehicle is located;

perform coordinate conversion on the target pixel coordinate according to a target image capturing parameter, to obtain a second point coordinate of the position point based on the vehicle coordinate system;

generate point cloud data corresponding to the position point according to the first point coordinate and the second point coordinate; and determine the image-altering information corresponding to the projection pattern according to a plurality of the point cloud data respectively corresponding to a plurality of the position points in the scene;

wherein the reference projection information is a reference pixel coordinate based on a first camera coordinate system, wherein the first camera coordinate system is a coordinate system of the image capturing device for collecting the reference image; and the target projection information is a target pixel coordinate based on a second camera coordinate system, wherein the second camera coordinate system is a coordinate system of the image capturing device for collecting the target image;

wherein the reference pixel point and a target pixel point respectively correspond to a position point in a space of the scene.

* * * * *